United States Patent Office 3,353,887
Patented Nov. 21, 1967

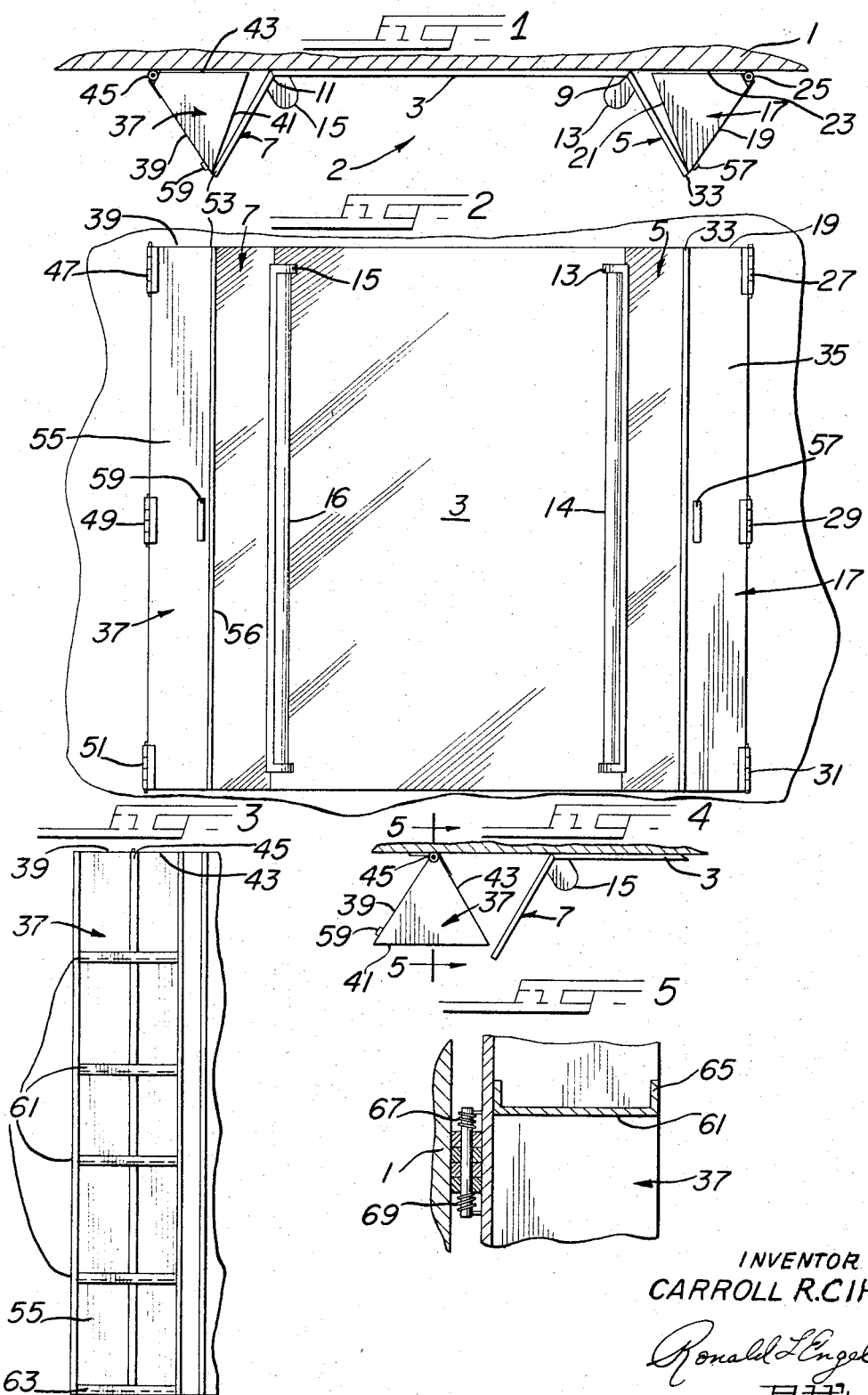

3,353,887
MIRRORED MEDICINE CABINET
Carroll R. Cihlar, 4136 Raymond Ave.,
Brookfield, Ill. 60513
Filed Mar. 28, 1966, Ser. No. 537,923
4 Claims. (Cl. 312—227)

This invention relates generally to medicine cabinets provided with mirrors and, more specifically, to a medicine cabinet in which storage shelves may be reached without interfering with accessibility to a mirror on the cabinet.

The desirability of combining a mirror with storage shelves, usually located in a bathroom, has long been recognized. Such an arrangement provides room for the storing of miscellaneous items, primarily an assemblage of bottles and boxes containing normal home medicines, while also providing a mirror for the use of any person in the room. Due to the fact that many of the items stored on the available shelves are medicinal in nature, these cabinets are frequently referred to as "medicine cabinets" (though they are most commonly used to store toilet articles such as razors, shampoos, cosmetics, etc.).

In the earliest and simplest type of arrangement, the cabinet and mirror were separate. However, this arrangement consumes a large amount of space and is not particularly appealing, in an aesthetic sense. To overcome the disadvantages of the separate mirror and cabinet arrangement, the mirrored medicine cabinet was evolved. In a mirrored medicine cabinet, the mirror performs a second function, namely that of being a door or wall for the cabinet. The two most common types of medicine cabinets are those having a pair of sliding mirror doors and those having a single pivoted mirror door. These types of cabinets have the disadvantages that full access to all of the storage area at one time cannot be accomplished (in the case of the sliding mirror door units), and that when the door is opened the complete mirror is no longer accessible to a person who wishes to use the mirror (in the case of the single pivoted mirror door units and to a degree in the case of the sliding mirror door units). While the sliding door type of medicine cabinet has part of the mirror accessible to a user when one of the doors is opened (so that the storage shelves may be reached), it has the disadvantages that the sliding doors are relatively hard to operate, that movement of the doors may be quite noisy, and that only a part of the complete mirror may be utilized when opened. The net result of these disadvantages is that the user endures considerable interruption and annoyance during daily toilet chores. This is so because the storage unit of existing models is fixed, and thus the mirror inherently functions as a door and accordingly must move during opening and closing operations.

These disadvantages or prior art medicine cabinets have been overcome by the present invention. Briefly, in the preferred embodiment described herein, this invention provides a mirror having a flat central mirror panel and a pair of side mirror sections. One of the side mirror sections is positioned at each end of the central mirror panel at an obtuse angle with respect to the central mirror panel, and thus these sections may be described as extending wings at either end of the central mirror panel. Preferably, the side mirror sections are fixedly stationed (although some degree of movement may be permitted), and a light is provided at the juncture of the central mirror panel and the side mirror sections for the convenience of a user of the mirror.

A shelf-containing storage member is located behind each of the side mirror sections. The storage members have an open trough triangular cross-section determined by two wall sections intersecting at a triangular vertex and exposing the third side of the triangle as an open void. The storage members are pivotably mounted on the intersecting vertex so that the third open side normally faces the rear of the side mirror section. When a storage member is in a normal or closed position, one side wall of the triangular cross-section of the storage member thus extends from the pivoted vertex to the free end of the associated side mirror section. This side of the storage member forms a door for a storage space defined in effect as the volume between this side of the storage member, the associated side mirror section, and the supporting wall structure (actually, the other closed side wall of the triangular cross-section). When it is desired to make the storage shelves available to a user, the storage member is rotated about the pivoted vertex to an open position to expose triangularly shaped shelves provided within the storage space. In order to be able to move the storage member to the open position, it is necessary that the side wall of the triangular cross-section of the storage member which extends along the supporting wall structure (i.e., from the pivoted vertex toward the juncture of the associated side mirror section and the central mirror panel when the storage member is in its closed position) be at least as short as a line perpendicular to the associated side mirror section and extending to the pivoted vertex of the storage member. However, if the associated side mirror section is movably disposed (as for example movement between a normal position at an obtuse angle relative to the central mirror panel and an extended position perpendicular to the central mirror panel), then this exact geometrical relationship is not required. In order to prevent a too rapid opening or closing of the storage member and a consequent scattering of the objects on the storage shelves from the effects of centrifugal force, a drag arrangement of some type is preferably provided for the storage members.

Accordingly, a primary object of the present invention is to provide a mirrored medicine cabinet which overcomes the disadvantages of continually opening and closing the mirrored doors of cabinets known to the prior art by allowing the storage areas to be exposed while at the same time permitting the complete mirror to be always accessible to a person desiring to use the mirror (i.e., by having the mirror stationary and the storage area movable).

A further primary object of the present invention is to provide an economical multiple mirrored unit for common household use while at the same time providing convenient and accessible storage for medicines and toiletries.

Another object of the present invention is to provide a mirrored medicine cabinet having not only the constant accessibility advantages of a stationary mirror, but also the compactness and other advantages achieved by combining a mirror and a medicine cabinet storage member.

A further object of this invention is to provide a flexible medicine cabinet arrangement that may include one or two movable storage members, as desired, with an essentially stationary mirror structure.

These and other objects, advantages, and features of the subject invention will hereinafter appear, and, for purposes of illustration, but not of limitation, exemplary embodiments of the subject invention are shown in the appended drawings in which:

FIGURE 1 is a top plan view of a preferred embodiment of a mirrored medicine cabinet constructed in accordance with this invention;

FIGURE 2 is a front view of the medicine cabinet shown in FIGURE 1;

FIGURE 3 is a fragmentary front view of the left-hand portion of the medicine cabinet shown in FIGURE 2, but with the storage member rotated so that storage shelves are made available to a person desiring to make use of the shelves;

FIGURE 4 is a fragmentary top view of the FIGURE 3 disposition, corresponding to the left-hand portion of the medicine cabinet shown in FIGURE 1, but with the storage member rotated so that storage shelves are available to a person desiring to make use of the shelves; and FIGURE 5 is an enlarged fragmentary sectional view taken along the line 5—5 of FIGURE 4.

With reference to FIGURE 1, the medicine cabinet arrangement of the present invention is illustrated in conjunction with a supporting structure, such as an ordinary wall 1. A medicine cabinet mirror 2 comprises a central mirror panel 3 and extending side mirror sections 5 and 7. Central mirror panel 3 is positioned flat against wall 1. Side mirror section 5 is located at one end of central mirror panel 3, while side mirror section 7 is located at the other end of central mirror panel 3. All three of these mirror portions are conventional panel mirrors comprising mirror reflecting members (e.g., glass) mounted on suitable substrates (e.g., a metal frame) and having dimensions consistent with the location in which they are to be used.

Side mirror sections 5 and 7 are substantially identical and are preferably positioned in a generally fixed relationship to central mirror panel 3. This generally fixed relationship is such that side mirror sections 5 and 7 are at an obtuse angle with respect to central mirror panel 3. However, the obtuse angle between side mirror sections 5 and 7 and central mirror panel 3 need not be any specific size. Thus, the obtuse angle between side mirror sections 5 and 7 and central mirror panel 3 may be adjusted to provide optimum mirror viewing consistent with the space requirements of the particular location, but this angular relationship will not normally be altered during normal use of the medicine cabinet. However, if desired, the mirror portion itself of a side mirror section may be made movable relative to its supporting frame by appropriate hinge connections (not shown) in order to facilitate mirror adjustments.

A juncture 9 is defined by the abutment of side mirror section 5 and central mirror panel 3, and a corresponding juncture 11 is defined by the abutment of side mirror section 7 and central mirror panel 3. Conventional light fixtures 13, 15 are provided at junctures 9, 11, respectively. These light fixtures are provided with appropriate bulbs to illuminate the mirror area and to aid a user of the medicine cabinet. Light fixtures 13 and 15 may be of any conventional type that will provide the desired illumination. In FIGURE 2, these light fixtures have been shown as fixtures appropriate for use with elongated fluorescent bulbs 14 and 16, but they could just as well be fixtures for a plurality of incandescent light bulbs located along junctures 9 and 11, or other well known arrangements.

A medicine cabinet storage member 17 having an internal storage compartment is located behind side mirror section 5. In FIGURE 1, it may be seen that the storage member 17, when viewed from the top, has a triangular shape circumscribed by lines 19, 21, and 23. Since the triangular top view shape of storage member 17 is substantially identical to a cross-sectional view of member 17, these terms will be used interchangeably and the triangle formed by lines 19, 21 and 23 will be referred to as the triangular cross-section. At the vertex formed by the intersection of lines 19 and 23 of the triangular cross-section, the storage member 17 is pivotally mounted by a pivot arrangement 25. Pivot mounting arrangement 25 may be any conventional type of pivot mounting arrangement usually associated with a door, such as an elongated rod and pintle arrangement or, as shown in FIGURE 2, a plurality of hinges 27, 29, and 31. When storage member 17 is in a closed position (the closed position is that illustrated in FIGURE 1), line 19 extends between the pivot mounting arrangement 25 and the free end 33 of side mirror section 5. As may be seen from the FIGURE 2 view, line 19 of the triangular cross-section is actually representative of a door 35. Door 35 has the appearance of a conventional cabinet door and provides a finished appearance for the medicine cabinet when storage member 17 is in its closed position. If desired, a mirrored surface can be provided for door 35, although of course the exact decorative appearance of the surface of door 35 is merely a matter of aesthetic preferences.

In order to permit storage member 17 to be rotated to an open position about the pivot mounting 25 in the illustrated embodiment of the invention, it is necessary that the side of the compartment represented by line 23 not contact side mirror section 5 during the opening movement. It may be seen that this condition will be met if the side of storage member 17 represented by line 23 is shorter than the altitude of a storage space triangle having as its base side the side mirror section 5 (i.e., the triangular cross-section of the storage space, which is greater in area than the triangular cross-section of the storage member itself). The storage space triangle also has another side corresponding to line 19 of the cross-section of storage member 17, and a third side corresponding to a line between pivot mounting 25 and juncture 9. Since the altitude of this triangle will be a line perpendicular to side mirror section 5 and extending to pivot mounting point 25, and since the side represented by line 23 also extends from pivot mounting point 25, the storage member 17 will not contact side mirror section 5 if side 23 is at least as short as this altitude. As a practical matter, it will generally be desirable to have line 23 somewhat shorter than the length of the altitude of the storage space triangle in order to provide a certain amount of clearance in case of inaccurate mounting or in case of mirror dislocations that usually occur with time. Of course, the side represented by line 23 of storage member 17 may have any length less than the altitude of the storage space triangle, depending upon the size of the storage compartment that is required. Normally, it would be desirable to have the largest possible storage compartment, so that line 23 would be only slightly shorter than the altitude of the storage space triangle.

An alternate approach (not illustrated in the drawing) would be to have side mirror section 7 pivotally mounted to central mirror panel 3 for movement between a normal position at an obtuse angle relative to panel 3 and an extended position at a lesser obtuse angle or even perpendicular to panel 3. Section 7 could be appropriately mounted (as by spring biasing means) to coact with suitable stop means between the two indicated positions. With this arrangement, the exact geometric relationship described for the illustrated embodiment is not required since opening movement of storage member 17 may serve to cam section 7 from its normal to its extended position in order to effect the desired opening. This alternate approach could be adopted for the practice of the present invention, but in most instances the simplicity of the illustrated embodiment renders it more practical and economical without affecting its utility.

A storage compartment providing storage member 37 similar to storage member 17 is located behind side mirror section 7. Storage member 37 has a triangular shape defined by lines 39, 41, and 43 in the top view, which corresponds to its triangular cross-section. Due to this correspondence, the top view triangular shape and the triangular cross-section will be referred to interchangeably and the triangle formed by lines 39, 41, and 43 will be termed the triangular cross-section. A pivot mounting arrangement 45 is provided at the vertex formed by lines 39 and 43 of the triangular cross-section of storage member 37. Pivot mounting arrangement 45 comprises the series of hinges 47, 49, and 51. When storage member 37 is in the closed position illustrated in FIGURE 1, the line 39 of the triangular cross-section extends from pivot mounting 45 to free end 53 of the side mirror section 7. Corresponding to the description in connection with storage member 17, line 39 of the triangular cross-section is representative of a door 55. Also as explained in connection with storage member 17, the side of storage compartment 37 corresponding to line 43 of the triangular cross-section has a length less than the altitude of a storage space triangle, having as its base side the side mirror section 7, a second side corresponding to side 39 of the triangular cross-section, and a third side corresponding to the distance from pivot mounting 45 to juncture 11.

A front view of the appearance of the medicine cabinet, with storage compartments 17 and 37 in the closed position described in connection with FIGURE 1, is illustrated in FIGURE 2. The vertical height of the medicine cabinet, as represented by line 56 will depend upon the particular location at which it is placed. In the most common location, over the bathroom sink, the vertical height 56 will depend upon the distance the sink is located above the floor, the desired distance between sink and medicine cabinet, and the desired position for the top of the medicine cabinet. It may be seen that the over-all appearance of the cabinet is that of a large central mirror with two smaller side mirror portions and a cabinet on either end. With the mirrors illuminated by light bulbs 14 and 16, and the finished doors 35 and 55 being the only visible parts of the storage members, a compact medicine cabinet that has the appearance of being primarily a mirror and that is aesthetically pleasing has been produced.

When it is desired to gain access to storage members 17 and 37, an appropriate opening arrangement, illustrated schematically as a handle 57 for storage member 17 and a handle 59 for storage member 55, is actuated. Pulling handle 59 (for example) causes storage member 37 to pivot about pivot mounting 45 to reach an open position illustrated in FIGURE 4. When a storage member 17 or 37 is in the open position (illustrated only for storage member 39 in FIGURES 3 and 4), storage materials may either be inserted in the storage compartment or removed therefrom. Thus, the contents of the medicine cabinet may be easily reached without any movement of the mirror, and therefore the full mirror is always accessible to a person desiring to use the mirror, even if the storage members are in an open position. For example, if one person is using the mirror, another person may gain access to the contents of the medicine cabinet without disturbing the person using the mirror. Also, if the user of the mirror needs a number of objects from the cabinet he may leave the storage member in the open position, and hence, be able to continuously use the mirror while removing and replacing the various objects without having to open and close the cabinet door each time.

In FIGURE 3, the internal structure of the storage compartment of storage member 37 is illustrated (the construction of the storage compartment of storage member 17 being substantially similar except for the reversed positions of door 35, corresponding to door 55 in member 37, and the reversed position of the side corresponding to line 23 of the triangular cross-section, corresponding to line 43 in member 37). On the inner portion of the storage compartment of member 37, a plurality of storage shelves 61 are arranged at appropriately spaced and preferably adjustable (by conventional means) vertical intervals. While four shelves are shown in the FIGURE 3 embodiment (corresponding to five storage levels because of a bottom 63 provided for storage member 37), it should be realized that any number of shelves may be utilized depending upon the number of shelves desired and the required spacing that must be maintained between shelves. Shelves 61 have essentially the same triangular shape as the top and cross-sectional views of storage member 37, as shown in the top views of FIGURES 1 and 4. These shelves may be constructed of any desired material and will provide a relatively large storage area, which is primarily limited by the vertical height of the medicine cabinet itself. If desired, a closed top may be provided for storage member 37.

To aid in maintaining the contents of the medicine cabinet on the shelves, shelves 61 are preferably provided with a vertical lip 65, as best shown in FIGURE 5. Because the pivotal, or rotary, movement of the storage member will cause a centrifugal force to be exerted on the objects placed on shelves 61, a rapid opening and closing of the storage member may cause the items to be ejected from the storage member in spite of lip 65. In order to prevent this from occurring, it is desirable to provide a drag means for preventing the cabinet from being opened or closed too rapidly. The drag means is illustrated schematically in FIGURE 5 by opposed springs 67 and 69, one of which will oppose the opening of the door, while the other will oppose the closing of the door. While the drag means have been schematically illustrated as a pair of opposed springs, this has been only for purposes of illustration, as there are many conventional arrangements that would serve equally well in the unique combination provided by the subject invention. It may also be desirable to provide a conventional locking or latching arrangement (not shown) by which the storage member may be maintained in a closed position when so desired.

The description of the present invention has been directed to a complete medicine cabinet. However, this invention is not limited to a complete cabinet but may also be practiced by utilizing a portion thereof. Thus, a side mirror section and a storage member may be mounted adjacent a previously positioned mirror to form a medicine cabinet having the advantages of this invention. Similarly, a side mirror section and a storage member could be mounted on both sides of a previously positioned planar mirror. Thus, a flexible medicine cabinet structure having many modes of construction is provided.

It should be understood that the description herein is merely exemplary of the preferred practices of the present invention and that various changes, modifications, and variations may be made in the details of construction, arrangements, and operations of the elements disclosed herein, without departing from the spirit and scope of the present invention, as defined in the appended claims.

What is claimed is:
1. A medicine cabinet comprising:
    a central mirror panel;
    a first side mirror section positioned at one end of said central mirror panel;
    a first shelf-containing storage member pivotally supported in a first storage space behind said first side mirror section so that shelves contained in said first storage member are normally hidden from view behind said first side mirror section and may be easily rendered accessible by rotation of said first storage member;
    a second side mirror section positioned at a second end of said central mirror panel opposite said first end; and
    a second shelf-containing storage member pivotally supported in a second storage space behind said second side mirror section so that shelves contained in said second storage member are normally hidden from view behind said second side mirror section any may be easily rendered accessible by rotation of said second storage member, wherein:
    said first and second side mirror sections are each fixedly positioned at an obtuse angle with respect to said central mirror panel;
    each of said first and second storage members has a triangular cross-section, with a side of the storage member corresponding to a first side of the triangle serving as a door to normally prevent access to an associated one of said storage spaces;
    each of said storage members is pivotally supported at a vertex of said triangular cross-section formed by said first side of the triangle and a second side of the triangle; and said second side of the triangle has a length equal to or less than the length of a line perpendicular to said side mirror section and extending from said side mirror section to said pivotally supported vertex.

2. A medicine cabinet as claimed in claim 1 and further comprising:

a first juncture located at the intersection of said central mirror panel and said first side mirror section and a second juncture located at the intersection of said central mirror panel and said second side mirror section; and a lighting arrangement placed at each of the junctures.

3. A medicine cabinet as claimed in claim 1 and further comprising means for impeding the rotational velocity of said storage members.

4. A medicine cabinet as claimed in claim 1 and further comprising spring drag means for impeding the rotational velocity of said storage members.

References Cited

UNITED STATES PATENTS

| | | | |
|---|---|---|---|
| 1,463,511 | 7/1923 | Lane | 312—227 |
| 1,600,830 | 9/1926 | Lewis | 312—227 |
| 1,966,800 | 7/1934 | Katzman | 312—225 |
| 3,178,243 | 4/1965 | Dirmeyer | 312—200 |
| 3,186,781 | 6/1965 | Lax | 312—200 |
| 3,202,469 | 8/1965 | Lawe | 312—223 X |

CASMIR A. NUNBERG, *Primary Examiner.*